US011886981B2

(12) United States Patent
Shah et al.

(10) Patent No.: US 11,886,981 B2
(45) Date of Patent: Jan. 30, 2024

(54) INTER-PROCESSOR DATA TRANSFER IN A MACHINE LEARNING ACCELERATOR, USING STATICALLY SCHEDULED INSTRUCTIONS

(71) Applicant: SiMa Technologies, Inc., San Jose, CA (US)

(72) Inventors: Nishit Shah, Sunnyvale, CA (US); Srivathsa Dhruvanarayan, Saratoga, CA (US); Reed Kotler, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 438 days.

(21) Appl. No.: 16/865,226

(22) Filed: May 1, 2020

(65) Prior Publication Data

US 2021/0342673 A1  Nov. 4, 2021

(51) Int. Cl.
*G06N 3/063* (2023.01)
*G06N 3/08* (2023.01)

(52) U.S. Cl.
CPC .............. *G06N 3/063* (2013.01); *G06N 3/08* (2013.01)

(58) Field of Classification Search
CPC ............ G06N 3/063; G06N 3/08; G06N 3/04; G06N 20/00; G06N 20/10; G06N 20/20
See application file for complete search history.

(56) References Cited

U.S. PATENT DOCUMENTS

| 9,928,460 | B1 | 3/2018 | Nowatzyk et al. |
|---|---|---|---|
| 2001/0029520 | A1 | 10/2001 | Miyazaki et al. |
| 2005/0257194 | A1* | 11/2005 | Morrow ................... G06F 8/34 717/109 |
| 2013/0297370 | A1 | 11/2013 | Pegden |
| 2016/0379686 | A1 | 12/2016 | Burger et al. |

(Continued)

OTHER PUBLICATIONS

Andri et al., "YodaNN: An Architecture for Ultralow Power Binary-Weight CNN Acceleration", IEEE Transactions on Computer-Aided Design of Integrated Circuits and Systems, vol. 37, No. 1, Jan. 2018, pp. 48-60.

(Continued)

*Primary Examiner* — Edward Chin
(74) *Attorney, Agent, or Firm* — Fenwick & West LLP

(57) ABSTRACT

A compiler generates a computer program implementing a machine learning network on a machine learning accelerator (MLA) including interconnected processing elements. The computer program includes data transfer instructions for non-colliding data transfers between the processing elements. To generate the data transfer instructions, the compiler determines non-conflicting data transfer paths for data transfers based on a topology of the interconnections between processing elements, on dependencies of the instructions and on a duration for execution of the instructions. Each data transfer path specifies a routing and a time slot for the data transfer. The compiler generates data transfer instructions that specify routing of the data transfers and generates a static schedule that schedules execution of the data transfer instructions during the time slots for the data transfers. The static schedule also schedules execution of compute instructions for computations using transferred data that implement the machine learning network.

20 Claims, 14 Drawing Sheets

(56) References Cited

U.S. PATENT DOCUMENTS

| | | | |
|---|---|---|---|
| 2017/0103299 A1* | 4/2017 | Aydonat | G06N 3/0454 |
| 2017/0178386 A1 | 6/2017 | Redshaw et al. | |
| 2019/0004878 A1 | 1/2019 | Adler et al. | |
| 2019/0018815 A1 | 1/2019 | Fleming et al. | |
| 2019/0076031 A1 | 3/2019 | Valys et al. | |
| 2019/0114548 A1* | 4/2019 | Wu | H04W 72/54 |
| 2019/0155768 A1 | 5/2019 | Wilkinson et al. | |
| 2019/0205737 A1 | 7/2019 | Bleiweiss et al. | |
| 2019/0286973 A1 | 9/2019 | Kovvuri et al. | |
| 2019/0303346 A1 | 10/2019 | Brewer | |
| 2019/0391796 A1 | 12/2019 | Brady et al. | |
| 2020/0007342 A1 | 1/2020 | Liem et al. | |
| 2020/0012536 A1 | 1/2020 | Lacey et al. | |
| 2020/0012537 A1 | 1/2020 | Lacey et al. | |
| 2020/0073830 A1 | 3/2020 | Verrilli et al. | |
| 2020/0090383 A1 | 3/2020 | Dwivedi | |
| 2020/0133914 A1 | 4/2020 | Wilkinson et al. | |
| 2020/0150713 A1 | 5/2020 | Knowles et al. | |
| 2020/0272892 A1 | 8/2020 | Desappan et al. | |
| 2020/0320403 A1 | 10/2020 | Daga et al. | |
| 2021/0174137 A1* | 6/2021 | Kim | G06V 10/82 |
| 2021/0197967 A1 | 7/2021 | Song et al. | |
| 2021/0201526 A1 | 7/2021 | Moloney et al. | |
| 2021/0240524 A1 | 8/2021 | Gangani et al. | |
| 2021/0278810 A1 | 9/2021 | Heesche et al. | |
| 2022/0044153 A1 | 2/2022 | Madar et al. | |

OTHER PUBLICATIONS

Ankit et al., "PUMA: A Programmable Ultra-efficient Memristor-based Accelerator for Machine Learning Inference", ASPLOS'19, Apr. 13-17, 2019, Providence, RI, USA, pp. 715-731.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

Jiao et al., "A 12nm Programmable Convolution-Efficient Neural-Processing-Unit Chip Achieving 825TOPS", ISSCC 2020, Session 7, Feb. 18, 2020, 5 pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification: A Review", IEEE Access, vol. 7, 2019, pp. 7823-7858.

International Search Report and Written Opinion, PCT Patent Application No. PCT/US2021/027998, dated Aug. 25, 2021, 22 pages.

United States Office Action, U.S. Appl. No. 16/862,515, dated Aug. 17, 2022, 30 pages.

* cited by examiner

US 11,886,981 B2

INTER-PROCESSOR DATA TRANSFER IN A MACHINE LEARNING ACCELERATOR, USING STATICALLY SCHEDULED INSTRUCTIONS

BACKGROUND

1. Technical Field

This disclosure relates generally to the implementation of machine learning networks on hardware.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether (or to what confidence level) objects are present within the images.

Machine learning networks typically require a large volume of data transfer and the execution of a large number of computations. As a result, they are commonly implemented in compute facilities with access to significant resources, such as in the cloud or on server clusters with access to complex networking. However, the sources of input to machine learning networks may be located remotely from these compute facilities. For example, cameras and other types of sensors may be located on the edge of the network. Example applications for edge devices include automotive and other forms of transportation including autonomous transportation, agricultural, industrial, robotics, drones, surveillance and security, smart environments including smart cities, medical, and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. Thus, one common paradigm is for the input sources to be web-based so that they can continuously send their captured data to the cloud-based compute facility, which then executes the machine learning network and returns the result.

However, there can be many advantages if the machine learning network and computing elements on which it executes was instead embedded on edge devices, such as combined with the camera system. Furthermore, edge devices often include hardware that implements routing tables or congestion arbitration to facilitate data transfer without errors, and there can be advantages if the hardware requirements of edge devices are reduced without increasing data transfer errors.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Machine learning networks typically require a large number of computations and the handling of a large amount of data for those computations. For example, a typical node in a machine learning network may compute an output:

$$y = F(\Sigma w_i x_i + b) \quad (1)$$

where $x_i$ are the inputs received from other nodes i, $w_i$ are weights, b is a bias and F( ) is a nonlinear operator. In order for a processing element to complete this computation, the requisite data must be available to the processing element. For the first layer, the $x_i$ may be input samples received from external sources. For later layers, the $x_i$ typically are outputs from previous layers. The weights $w_i$, bias b and operator F( ) are parameters of the machine learning network, which typically are stored in an external memory. Including intermediate values, there may be millions, billions, trillions or even more pieces of data that must be transferred to the right processing elements at the right time in order to implement a machine learning network.

Figure 1A:
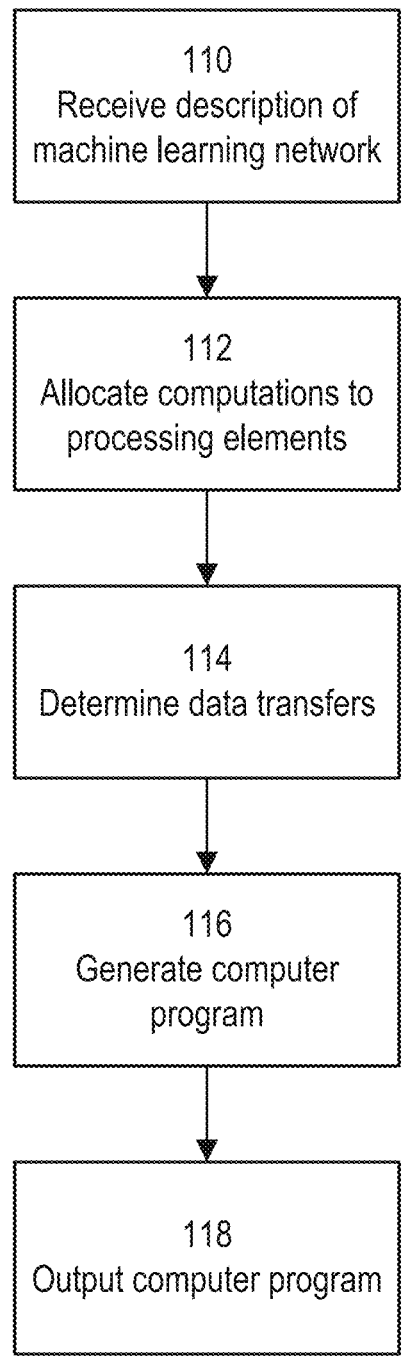
FIG. 1A is a flowchart illustrating a process for generating statically scheduled data transfer instructions.

In one approach, a machine learning accelerator (MLA) achieves this by statically scheduled data transfer instructions, as shown in FIG. 1A. A compiler receives 110 a description of a machine learning network and generates the computer program that implements the machine learning network. The compiler allocates 112 computations to different processing elements in the MLA for execution such that different groups of processing elements implement different layers of the machine learning network. The compiler also determines 114 what data transfers are required in order to implement the computations, e.g., what data must be available at a processing element so that it can complete its computation and where that data is coming from. The data may come from other processing elements, or it may come from other sources such as external or internal memory.

The compiler then generates 116 a computer program that includes compute instructions that implement the computations and data transfer instructions that implement the data transfers. These instructions are statically scheduled for execution on the MLA, meaning that the compiler can determine which instructions are executed by which processing elements at what times, as will be explained in greater detail below. In order to statically schedule the data transfer instructions, the compiler determines data transfer paths for the data transfers based on a topology of the interconnections between processing elements and between processing elements and memory, on dependencies of the instructions, on a duration for execution of the instructions, and on how other data transfers are utilizing the topology of interconnections. For each data transfer, the compiler analyzes all possible data transfer paths and generates a non-colliding data transfer path. Because the compiler can determine these at compile-time rather than at run-time, it can ensure that the data transfer instructions are not conflicting (i.e., two instructions are not scheduled to use the same data transfer path at the same time) and can be executed by the processing elements without requiring hardware that implements hardware routing tables or congestion arbitration (e.g., queuing for managing contention and collision). Similarly, data transfers in and out of memory for the processing elements can be scheduled without the hardware that implements hardware routing tables or congestion arbitration.

The compiler outputs 118 the computer program. Each data transfer path is defined by a routing (including any wait cycles) and a time slot for the data transfer. The data transfer instruction produced by the compiler specifies the routing, and the static schedule produced by the compiler specifies the time slot for execution of the data transfer instruction. The compute instructions are also statically scheduled.

In one approach, to generate the data transfer instructions, the compiler considers different data transfer paths for data transfers between two nodes in the MLA. Typically, one node will be a processing element of the MLA and the other node may be another processing element or some other memory of the MLA. The compiler may consider different routings for the data transfer path from the source node to the destination node. In addition to considering possible routings through the nodes defined by the MLA topology, the compiler also evaluates data transfer paths along a time dimension of what time slots are available for which routings.

In one approach, the compiler determines candidate data transfer paths (i.e., routings and time slots) for the data transfers. It determines which of the candidate data transfer paths are available, since some data transfer paths may already be occupied by other data transfers. It then selects from among the available candidate data transfer paths.

In an alternative approach, the compiler uses default rules to generate default data transfer paths for the data transfers. It determines whether there are any conflicts among the default data transfer paths and then modifies the data transfer paths to resolve the conflicts.

Figure 1B:
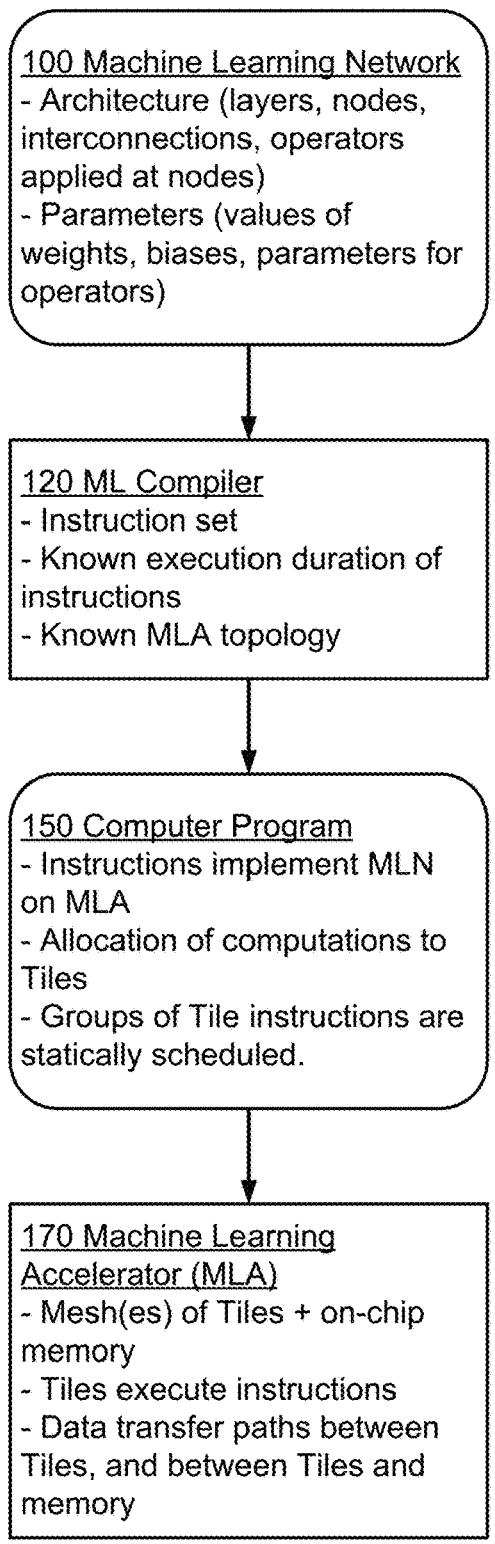
FIG. 1B is a block diagram of a system with a machine learning accelerator (MLA) and corresponding compiler.
Figure 1B:
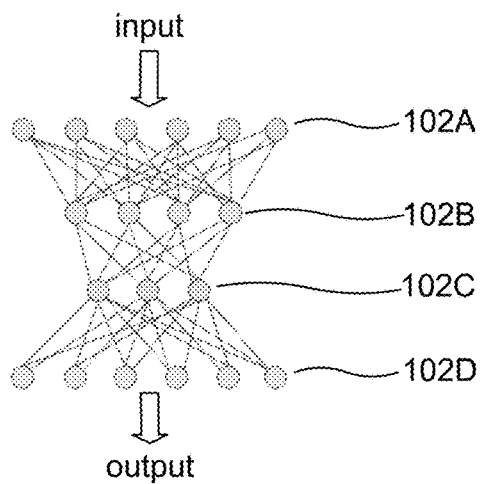
Figure 1B:
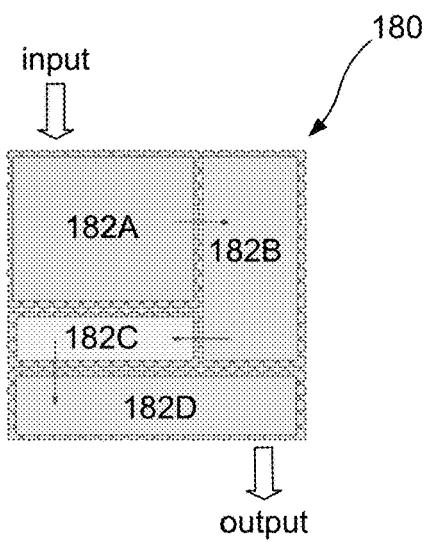
Figure 1C:
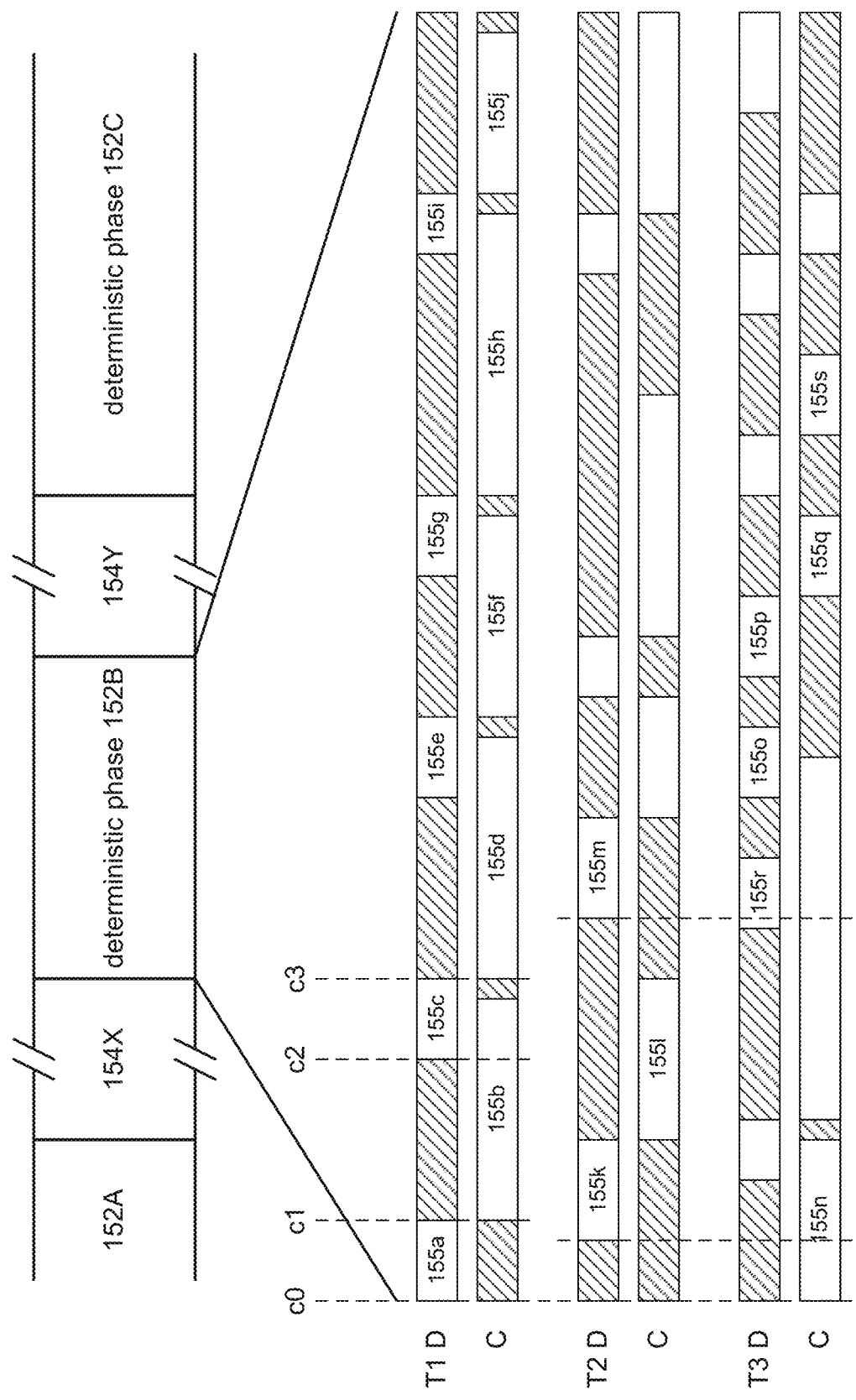
FIG. 1C illustrates partitioning a computer program into deterministic and non-deterministic phases.

FIGS. 1B and 1C provide some additional context. FIG. 1B is a block diagram of one example of a system with a machine learning accelerator (MLA) 170 and corresponding compiler 120, according to the invention. The compiler 120 receives a description of a machine learning network 100 and generates a computer program 150 that implements the machine learning network using MLA 170. The computer program 150 includes instructions that are executed by processing elements (Tiles) in the MLA according to a schedule determined by the compiler. For convenience, these will be referred to as statically scheduled instructions. The instructions executed by the Tiles (Tile instructions) are statically scheduled because the compiler can determine which instructions are executed by which Tiles at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity off-loaded to the compiler. A simpler MLA can result in lower cost, lower power consumption and higher performance, all of which are desirable for implementation in edge devices.

In more detail, the MLN 100 may be described by an architecture and parameters. A depiction of an MLN is shown to the right of box 100 in FIG. 1B. Most MLNs include multiple layers 102, each with one or more nodes which are represented by circles in FIG. 1B.

The lines between nodes in FIG. 1B represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tan h function), softmax operator, etc. A typical node may compute an output:

$$y = F(\Sigma w_i x_i + b) \qquad (2)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 170 includes a plurality of Tiles 180 and an on-chip memory system implemented on a semiconductor die. The Tiles are organized into one or more meshes of interconnected Tiles. A depiction of a Tile mesh is shown to the right of box 170 in FIG. 1B. In each mesh, the Tiles 180 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 1B, the computations performed by layers 102A-D are allocated to groups 182A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 120 receives a description of the MLN 100 and generates a computer program 150 that implements the MLN using the MLA 170. The computer program 150 receives an input sample for the MLN and executes the operations of the MLN to produce the output for the MLN. The computer program 150 includes instructions to be executed by the Tiles for implementing computations in the MLN and may also include instructions to be executed by other elements, such as a controller outside the Tiles.

As shown in FIG. 1C, the compiler partitions the Tile instructions into one or more deterministic phases 152A,B,C which typically utilize multiple Tiles. The instructions in a deterministic phase 152 may be statically scheduled by the compiler. For example, a deterministic phase 152 may include a series of computations required to implement a portion of the MLN, where the time required for each computation and associated data transfers is known. As a result, the compiler may statically schedule the Tile instructions within that deterministic phase relative to the other Tile instructions in the phase. The resulting computer program produced by the compiler then implements an allocation of instructions to Tiles and a schedule for executing the instructions as determined by the compiler, although these may not be expressly contained within the computer program. In the example of FIG. 1B, the computations performed by layers 102A-D are allocated to groups 182A-D of Tiles as indicated. In addition, all of the Tile instructions (including both for computation and for data transfer) are executed in a single deterministic phase.

The computer program may also include non-deterministic phases 154X,Y. For example, non-deterministic phases 154 may include data fetch or instruction fetch from off-chip memory where the time required to execute the operation varies too much to allow reliable synchronization with other operations. Other examples include computations that occur off-chip, and conditions, branching and other programmatic constructs that depend on values not known until run-time. The breaks in the rectangles for the non-deterministic phases 154 indicate that the timing is not deterministic, whereas the deterministic phases 152 are represented by rectangles without breaks. In FIG. 1C, the deterministic and non-deterministic phases are shown as alternating. This is not required. For example, deterministic and non-deterministic phases may execute concurrently.

FIG. 1C also shows more detail of deterministic phase 152B, which shows the static schedule computed by the compiler for executing Tile instructions in this phase. The phase 152B begins at some time when all of the Tiles are synchronized, which for convenience is marked as cycle c0 in FIG. 1C. The Tiles may have circuitry that synchronizes the Tiles. For example, each Tile may monitor when it is ready to begin execution of a deterministic phase 152B and then actual execution begins when all Tiles signal that they are ready. Alternatively, an external controller may synchronize the Tiles and start the deterministic phase 152B when all Tiles are ready.

In this example, the instructions are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 155a transfers data into Tile 1 and instruction 155b then performs a computation that consumes that data. Instruction 155b is dependent on instruction 155a. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 155a is known, the compiler knows when the data will be available (for convenience, marked as cycle c1 in the figure) and can construct a static schedule in which instruction 155b starts execution then. The duration of instruction 155b is also known, so the compiler knows that compute instruction 155d may start after instruction 155b. In this case, the compiler determines a static schedule in which instruction 155d starts at cycle c3. Compute instruction 155d depends on data brought into the Tile by instruction 155c. The duration of instruction 155c is known, so the compiler knows that in the static schedule, instruction 155c must start at cycle c2 or earlier. This pattern is repeated for pairs of data transfer instructions and compute instructions 155e-f, 155g-h, 155i-j.

For Tile 2, compute instruction 155l depends on data from data transfer instruction 155k. However, instruction 155k does not start immediately at cycle c0. Rather, it has a delayed start at cycle c4. This may be because the data transfer path required by instruction 155k is occupied by some other data transfer instruction and is not available until cycle c4. The start time of instruction 155k in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 155k does not start until cycle c4 when the compiler knows the data transfer path will be available. Similarly, data transfer instruction 155m has a delayed start time. Perhaps the T2 D pipeline is being used to transfer out the results of computation 155*l* and does not become available until cycle c5.

For Tile 3, computation 155*n* starts immediately at cycle c0. Perhaps the required data was loaded into Tile 3 during some prior phase. Data transfer instructions 155*o* and 155*p* load data for compute instruction 155*q*. They are separated in time, perhaps because different pieces of data were not available or the data transfer paths were not available until those times. As a final example, data transfer instruction 155*r* loads data for compute instruction 155*s*. In the static schedule, the compiler places instruction 155*r* well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 1C, the computer program may specify that instruction 155*a* executes at cycle c0, instruction 155*b* at cycle c1, instruction 155*c* at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 155*a* will end at cycle c1 and instruction 155*b* is supposed to begin at cycle c1. It may fill the space between cycles c0 and c1 with NO-OPs for the T1 C pipeline. The T1 C pipeline then just continuously executes instructions from its queue, and the NO-OPs ensure that instruction 155*b* is executed according to the compiler's static schedule. In yet another approach, the static schedule may be implemented by hardware. The T1 C pipeline may just stall on the execution of instruction 155*b* until the data from instruction 155*a* is ready. The compiler knows that data will be ready at cycle c1 and, therefore, instruction 155*b* will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

Figure 4:
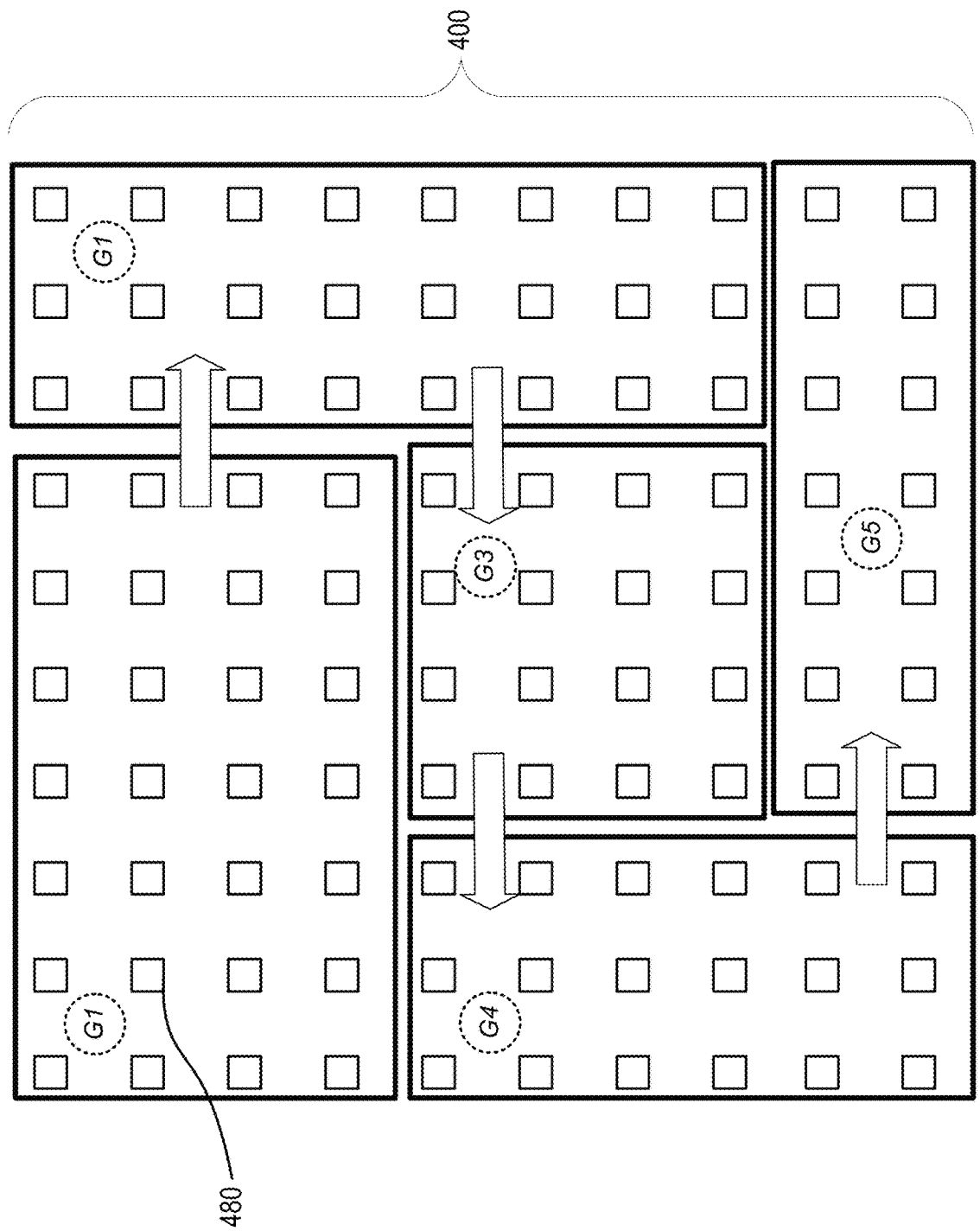
FIG. 4 is a diagram illustrating an example of an allocation of computations for implementing an MLN to groups of Tiles.
Figure 5:
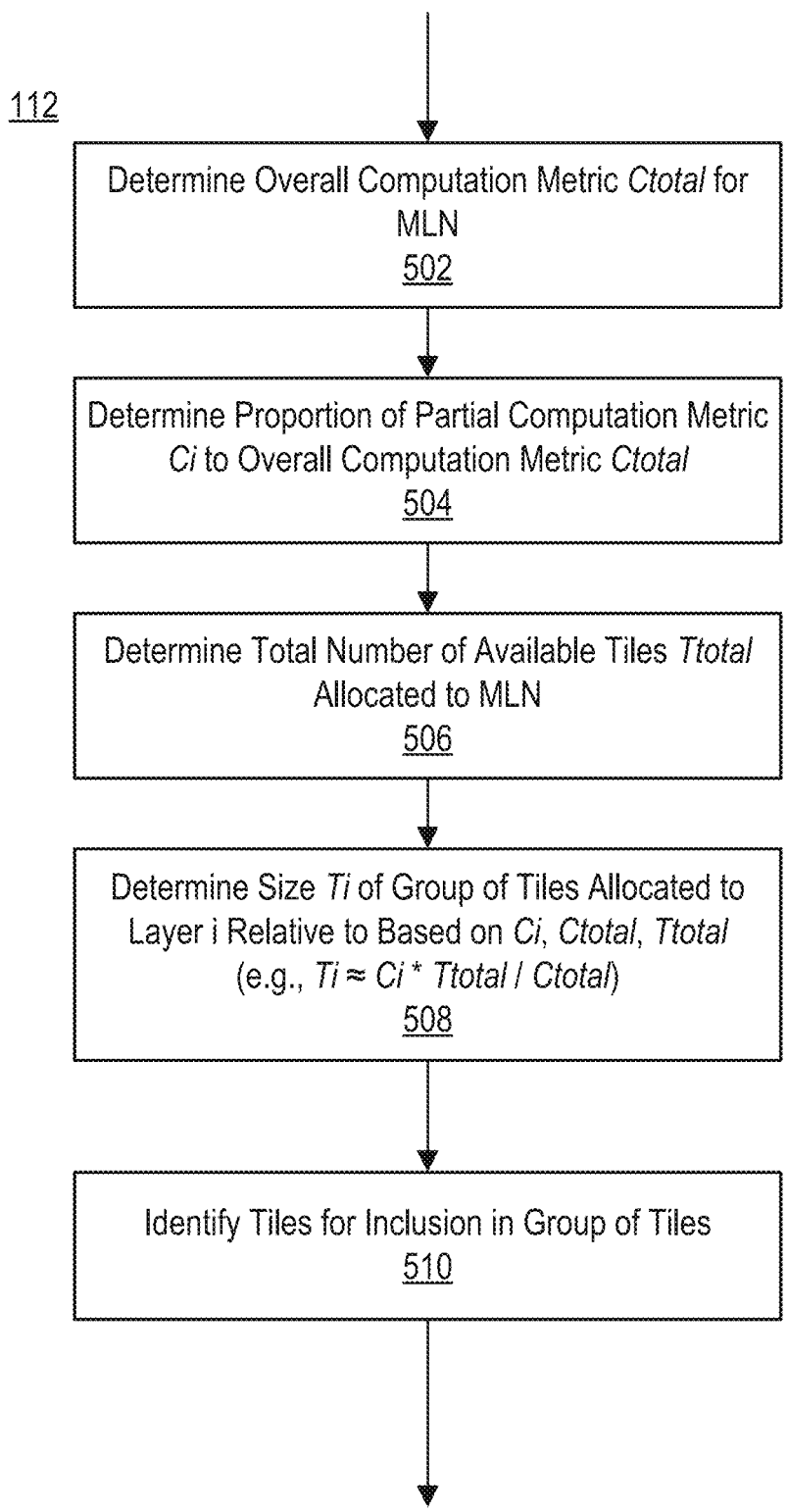
FIG. 5 is a flowchart illustrating an example embodiment of a process for allocating computations of a layer of an MLN to a group of Tiles.

In order to statically schedule the instructions in a deterministic phase, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided. FIGS. 4 and 5 provide further examples of how the compiler converts a description of an MLN to a deterministic phase of statically scheduled instructions executed by the Tiles.

Other aspects include components, devices, systems, improvements, methods, processes, applications, computer readable mediums, and other technologies related to any of the above.

Figure 2A:
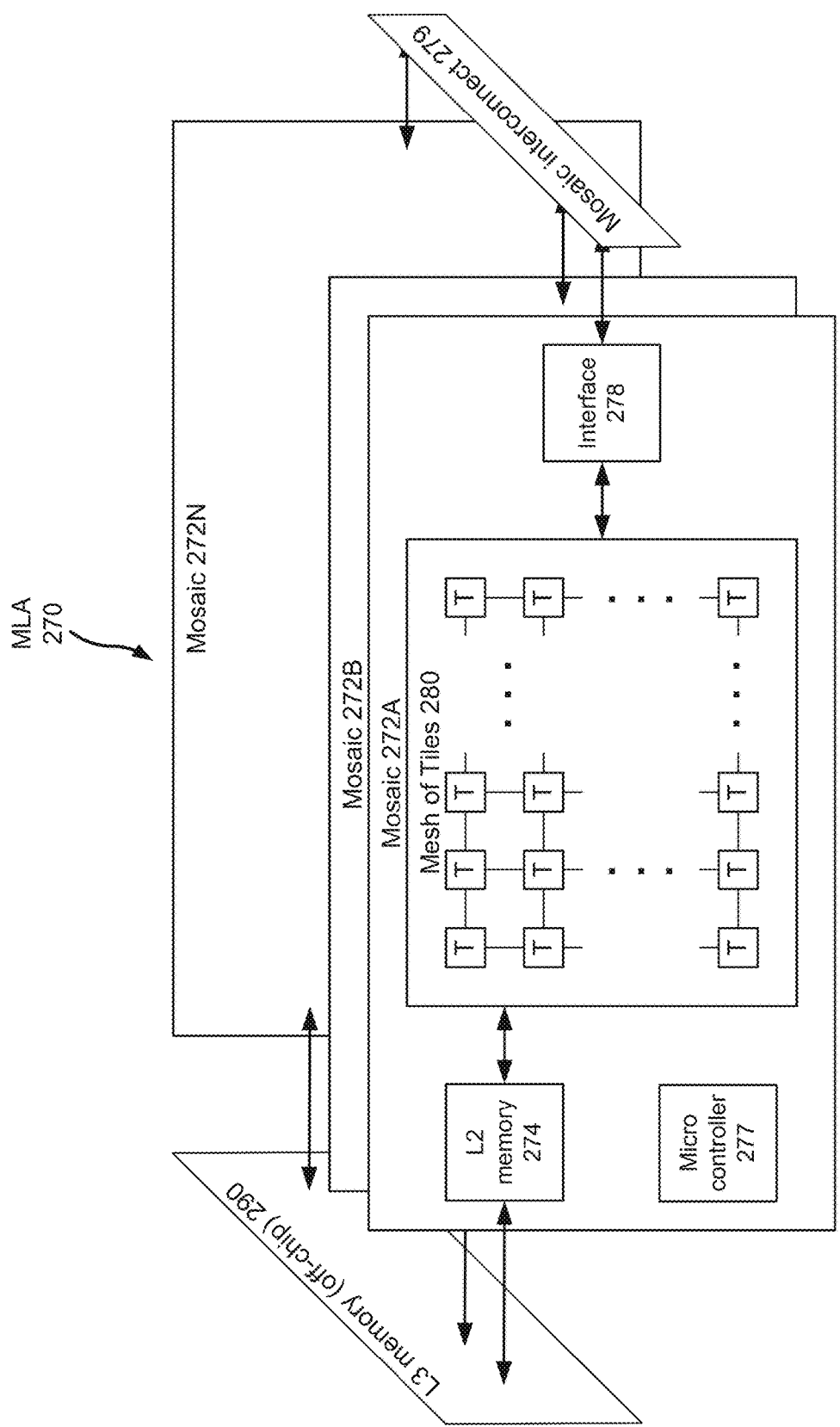
FIG. 2A is a block diagram of a hardware system including an MLA.
Figure 2B:
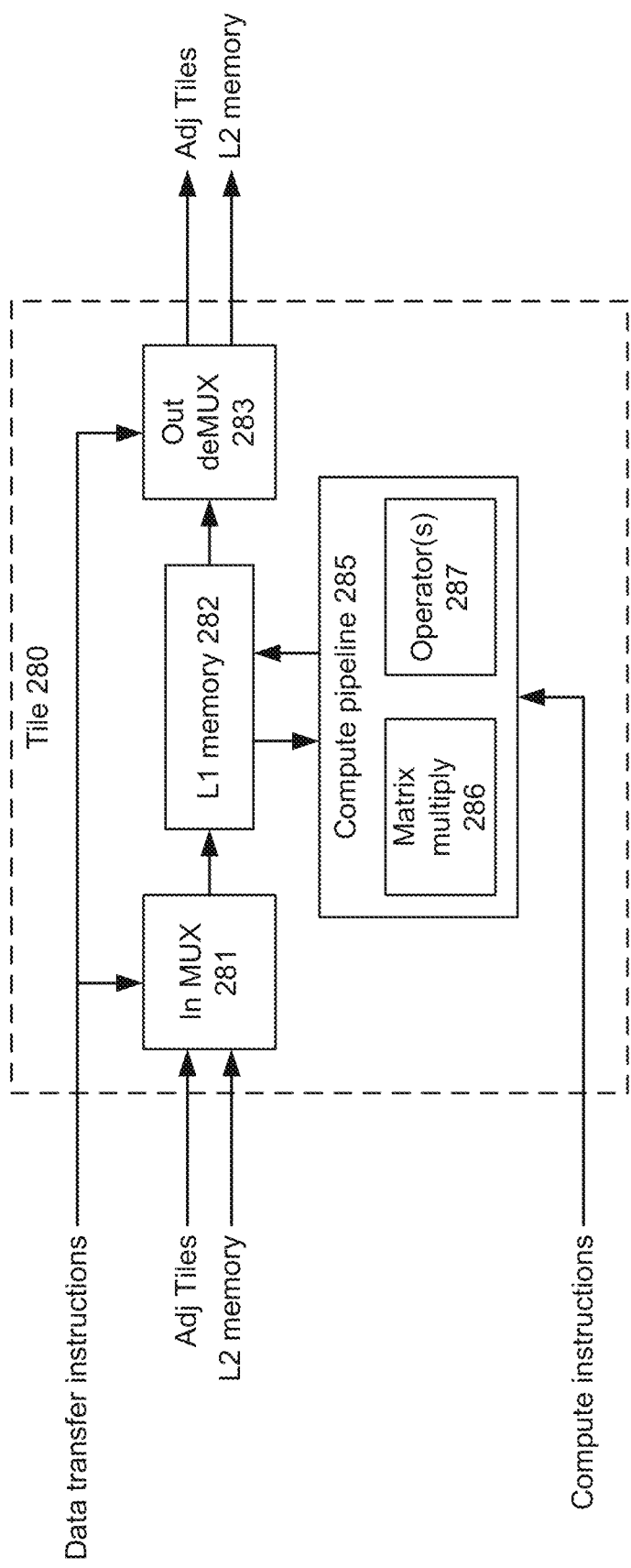
FIG. 2B is a block diagram of a Tile within an MLA.
Figure 3:
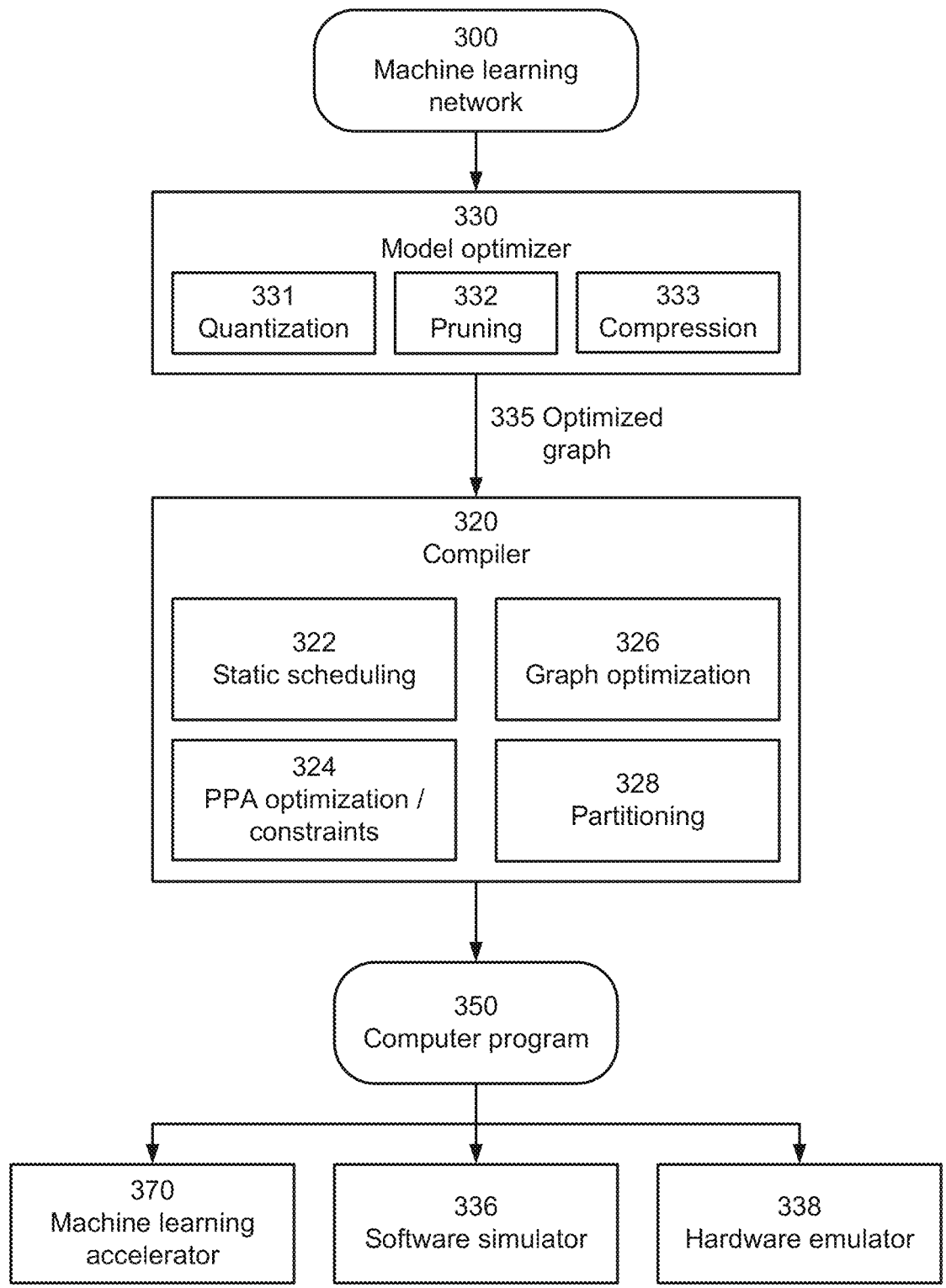
FIG. 3 is a block diagram of a software development environment including an ML compiler.

FIGS. 2-3 are more detailed descriptions of an example system that includes an MLA and corresponding compiler. FIG. 2 shows the hardware component and FIG. 3 shows the software development environment.

FIG. 2A is a block diagram of a hardware system including an MLA 270. The MLA 270 includes all the components shown in FIG. 2A, except the off-chip L3 memory 290. The MLA components are implemented on a single die as part of a single chip. The MLA 270 includes one or more mosaics 272A-N. In this example, all of the mosaics are the same. Each mosaic 272 includes a mesh of Tiles 280, an on-chip memory system and a controller 277. In FIG. 2A, the on-chip memory system is a multi-level memory system, which includes a level 1 (L1) memory distributed among the Tiles (see FIG. 2B) and a level 2 (L2) memory 274 shared by the Tiles. If there are multiple mosaics 272, the MLA 270 may include a dedicated interconnect 279 for connecting the different mosaics. Each mosaic also includes an interface 278 to the interconnect 279.

FIG. 2B is a block diagram of a Tile 280 within the MLA. In this example, all the Tiles are the same. Each Tile 280 includes an L1 memory 282. Each Tile 280 also includes a data transfer pipeline that executes instructions for transferring data to and from the L1 memory 282. Here, the Tiles 280 are arranged in a rectangular array as shown in FIG. 2A, with each Tile connected to its adjacent neighbors. Interior Tiles are connected to four adjacent Tiles. Edge Tiles are connected to adjacent Tiles and also to L2 memory 274. In FIG. 2B, the L1 memory 282 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles.

Each Tile 280 also includes a compute pipeline 285 for executing computations using data stored in the L1 memory 282. The L1 memory acts as software-configurable registers for the compute pipeline 285. The compute pipeline 285 includes matrix multiplication circuitry 286, such as a systolic array, and circuitry for implementing different types of operators 287. The computations are controlled by compute instructions received and executed by the Tiles.

In this particular example, all of the data transfer instructions and compute instructions executed by the Tiles are statically scheduled. These instructions include data transfer between L1 memories in different Tiles, and data transfer between L1 memory and L2 memory. Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 20 instructions, or not more than 50 instructions.

The L3 memory 290 is off-chip. In this example, the L1 and L2 memories are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler. However, data transfer from off-chip DRAM is more unpredictable in timing. As a result, these instructions are non-deterministic in nature and they are executed by the microcontroller 277. Therefore, they are executed in one of the non-deterministic phases and they are not statically scheduled.

In one approach, the instructions in the computer program and the data required for computation (e.g., input, weights, biases, parameters for operators) are initially loaded into L3 memory 280. From time to time, instructions and associated data are transferred from L3 memory into L1/L2 memory during a non-deterministic phase since the timing of data transfers from DRAM is not deterministic. Once these instructions and data are loaded into L1/L2 memory, the computer program enters a corresponding deterministic phase in which the Tiles execute the loaded instructions according to a static schedule. The non-deterministic and deterministic phases may occur concurrently. For example, data may be continuously streamed into the L1/L2 memory during the non-deterministic phase, with the corresponding statically scheduled instructions from the deterministic phase consuming that data. In one approach, the Tiles execute only statically scheduled instructions, and all non-statically scheduled instructions are executed by processing elements outside the Tile mesh, for example, the microcontroller 277.

SRAM has predictable timing so implementing the L1 and L2 memories as SRAM allows the compiler to statically schedule data transfers from those memories into the Tiles for computation. However, there is a limit to the amount of SRAM that may be implemented on a die. In order to increase the effective size of SRAM, a virtual SRAM approach may be used. In one approach, the compute instructions that consume certain data are not fetched into the Tiles until after the corresponding data have been transferred from DRAM (L3 memory) to SRAM (L1/L2 memory). This guarantees that the compute instructions will not be executed by the Tiles before the data is available. All data effectively will appear as if it is transferred to the Tiles from SRAM for computation, even if all of the data would not fit into the available SRAM.

L2 memory may also be used to temporarily store interim values that are too voluminous to store in L1 memory. For example, a layer K of the MLN may produce a large amount of data at its output, to be used as input to the next layer K+1. The layer K output may be stored in L2 memory and then retrieved from L2 memory as needed for the next layer's computations. This may be implemented using a ping pong buffer approach when multiple input samples are processed as a pipeline. The L2 memory is divided into two regions A and B. When a first input sample is processed, the layer K output is stored in region A of the L2 memory. The computations for layer K+1 retrieve the stored values from region A. At the same time, the second input sample is processed and the layer K output is stored in region B of the L2 memory. The two regions then alternate, with the Tiles implementing layer K storing to one region while the Tiles implementing layer K+1 read from the other region. The synchronization is implemented by the static scheduling. The compiler knows when regions A/B will be ready and the instructions to implement layer K+1 will execute after that time. No synchronization primitives are needed.

FIG. 3 is a block diagram of a software development environment including an ML compiler 320. In this example, the software development environment also includes a model optimizer 330. The model optimizer 330 receives a description of the MLN 300 and produces an optimized graph 335 of the MLN. It may apply optimizations such as quantization 331, pruning 332 and/or compression 333. Quantization 331 reduces the resolution of calculated values. For example, floating point values may be quantized to a certain number of bits and then integer math used instead of floating point math. This reduces the complexity and power consumed by the Tiles. Pruning 332 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 335 of the MLN may be expressed as a graph, in which the nodes of the graph represent nodes in the MLN and the edges of the graph represent the weighted interconnects. The compiler 320 receives the optimized graph 335 and produces the resulting computer program 350. The compiler 320 may perform operations including static scheduling 322, PPA (power performance area) optimizations 324, graph optimizations 326 and/or partitioning 328. Static scheduling 322 of the appropriate instructions was described above.

PPA optimization 324 includes different optimizations of the computer program 350. For example, the allocation of MLN computations to Tiles may be optimized to reduce power consumption, to increase performance (such as reducing latency or increasing throughput) and/or to reduce area (e.g., number of Tiles used).

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 320 may also optimize 324 the computer program 350, subject to constraints on power, performance, area and/or any of the quantities described above. Graph optimization 326 includes analysis of the graph representing the MLN to prune, merge or quantize links, parameters, values, and layers to achieve better performance. Partitioning 328 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 350 may be loaded into memory for execution on a machine learning accelerator 370. For example, one possible application is object detection. In this case, the inputs are images captured by a video camera. The MLN 300 has been trained to identify certain objects in the video images. The computer program 350 implementing the MLN is loaded onto memory that is accessible by the MLA 370, which is implemented as a chip inside the camera. This way, images captured by the video camera may be immediately analyzed by the computer program 350 running on the MLA 370.

In addition to the MLA 370, the computer program 350 or parts of it may be run on a software simulator 336 and/or hardware emulator 338 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

The approach based on static scheduling described above is not restricted to the examples described above. For example, different network topologies of Tiles may be used. Other Tile meshes may also be statically scheduled, so long as the time required to execute computations and to transfer data between Tiles is deterministic and may be determined at compile time.

FIGS. 4 and 5 illustrate examples of allocating computations to Tiles (step 112 of FIG. 1A). FIG. 4 illustrates an example embodiment of a technique for allocating groups of Tiles 480 for implementing computations of an MLN. In the illustrated embodiment, the compiler 120 allocates one group of Tiles Gi for each layer i of the MLN. For example, in an MLN with five layers, the compiler 120 allocates five groups of Tiles with each group Gi corresponding to one of the layers i of the MLN. In other allocations, there is not necessarily a one-to-one correspondence between the number of groups and number of layers in the MLN. For example, in some cases, there may be a greater number of layers than groups. Here, a single group Gi may perform computations associated with a set of adjacent layers of the MLN. For example, an MLN with fifteen layers may be allocated between five groups of Tiles in which the first group of Tiles G1 may perform computations associated with layers 1, 2, and 3; the second group of Tiles G2 may perform computations associated with layers 4, 5, and 6; the third group of Tiles G3 may perform computations associated with layers 7, 8, and 9; and so on. In another allocation scheme, layers may be allocated to groups of Tiles in a circular manner. For example, the first group of Tiles G1 may perform computations associated with layers 1, 6, and 11; the second group of Tiles G2 may perform computations associated with layers 2, 7, and 12; the third group of Tiles G3 may perform computations associated with layers 3, 8, and 13; and so on. In yet further embodiments, there may be a greater number of groups than layers. In this case, layers may be sub-divided into sub-layers with each sub-layer allocated to one group of Tiles.

The specific Tiles in each group may be assigned based on a set of predefined constraints and/or one or more optimization criteria. In an embodiment, as illustrated in the example of FIG. 4, each group of Tiles G may comprise a contiguous block such that each Tile 480 in the group Gi is physically adjacent to at least one other Tile 480 in the group Gi. The groups G may be limited to blocks of specific shapes (e.g., rectangles or squares) or the shape of the blocks may be unconstrained and may comprise arbitrary shapes. In other configurations, the compiler 120 does not necessarily constrain the groups of Tiles G to contiguous blocks and a single group G may instead include two or more discontinuous subsets of Tiles 480.

The groups of Tiles G may operate in a pipelined manner. Here, during each time period t, a new input sample is inputted to the first group of Tiles G1 implementing the first layer of the MLN and a new output sample is outputted from the last group of Tiles $G_N$ (where N is the number groups) implementing the last layer of the MLN. The groups of Tiles implementing the intermediate layers of the MLN each perform computations on the outputs from the group of Tiles implementing the previous layer in the MLN and generate outputs to the groups of Tiles implementing the subsequent layer of the MLN. Thus, at any given time period, the MLA 400 may perform processing associated with N different input samples in parallel, where N is the number of layers in the MLN.

FIG. 5 illustrates an example embodiment of a process for allocating 112 a group of Tiles Gi to execute the instructions implementing the layer i. The compiler 120 determines 502 an overall computation metric Ctotal for the MLN. For example, the overall computation metric Ctotal may represent a total number of matrix multiplications performed when implementing the MLN, a total number of computation instructions executed when implementing the MLN, a total number of computation and data transfer instructions executed when implementing the MLN, a total number of instructions cycles to implement the MLN, a total processing time for implementing the MLN, an estimated total power consumed by execution of the instructions implementing the MLN, or a combination thereof. The compiler 120 determines 504 a proportion of the partial computation metric Ci for the layer i relative to the overall computation metric Ctotal, e.g., Ci/Ctotal. The compiler furthermore determines a total number Ttotal of available Tiles for implementing the MLN. The total number of available Tiles may be manually assigned or may be determined automatically. For example, in one embodiment, the total number of available Tiles include all Tiles within a Mosaic. In another embodiment, the total number of available Tiles includes all Tiles in the MLA, which may span multiple Mosaics. In yet another embodiment, the total number of available Tiles includes all Tiles not otherwise assigned to a different MLN. In yet a further embodiment, the total number of available Tiles may be determined based on the overall computation metric Ctotal for the MLN. Here, an MLN having a higher overall computation metric Ctotal may be assigned a larger number of Tiles while an MLN having a smaller overall computation metric Ctotal may be assigned a smaller number of Tiles. In yet further embodiment, the total number of available Tiles may be based on configurable optimization criteria.

The compiler 120 determines 508 the size of the group of Tiles Gi for the layer i based on the partial computation metric Ci for the layer i, the total number of Tiles Ttotal allocated to the MLN, and the overall computation metric Ctotal for the MLN. For example, the size Ti of the group of Tiles Gi for the layer i may be determined as:

$$Ti = \text{round}\left(\frac{Ttotal \cdot Ci}{Ctotal}\right) \qquad (3)$$

Here, the rounding function may comprise rounding to the nearest integer, rounding to the nearest multiple of two integers (when enforcing a constraint in which the groups comprise rectangular blocks), rounding to the nearest square (when enforcing a constraint in which the groups comprise square blocks), or a different rounding function.

The compiler 120 identifies 510 specific Tiles for inclusion in the group of Tiles Gi having the size Ti. In an embodiment, the group of Tiles Gi is determined in a manner that enforces one or more predefined constraints. For example, the group of Tiles Gi may be constrained to contiguous blocks of predefined acceptable shapes such as rectangular blocks or square blocks. Furthermore, the blocks may be constrained based on minimum and/or maximum numbers of Tiles in the vertical or horizontal directions. In further embodiments, the compiler 120 may place constraints on the locations of the Tiles in a group of Tiles. For example, in an embodiment, the groups of Tiles are arranged such that blocks associated with adjacent layers of the MLN are arranged as adjacent blocks in the MLA. In other words, a group Gi (for $1 < i < i_{max}$ where $i_{max}$ is the total number of layers) includes one or more Tiles adjacent to one or more Tiles in the group $G_{i-1}$ and includes one or more Tiles adjacent to one or more Tiles in the group $G_{i+1}$. Furthermore, a group Gi implementing the first layer of the MLN and the group $G_{i_{max}}$ implementing the last layer of the MLN may each be positioned adjacent to L2 memory. In an embodiment, these constraints may be achieved by laying out the groups G as blocks in a snake pattern. In further embodiments, the specific Tiles for inclusion in each group may be selected to optimize some predefined optimization criteria. For example, the Tiles may be selected to minimize data transfer times between the groups. In an embodiment, the process for identifying 510 Tiles for inclusion in particular groups of Tiles may be performed iteratively to refine the groupings over multiple iterations according to a specified set of constraints and/or a specified set of optimization criteria.

Figure 6:
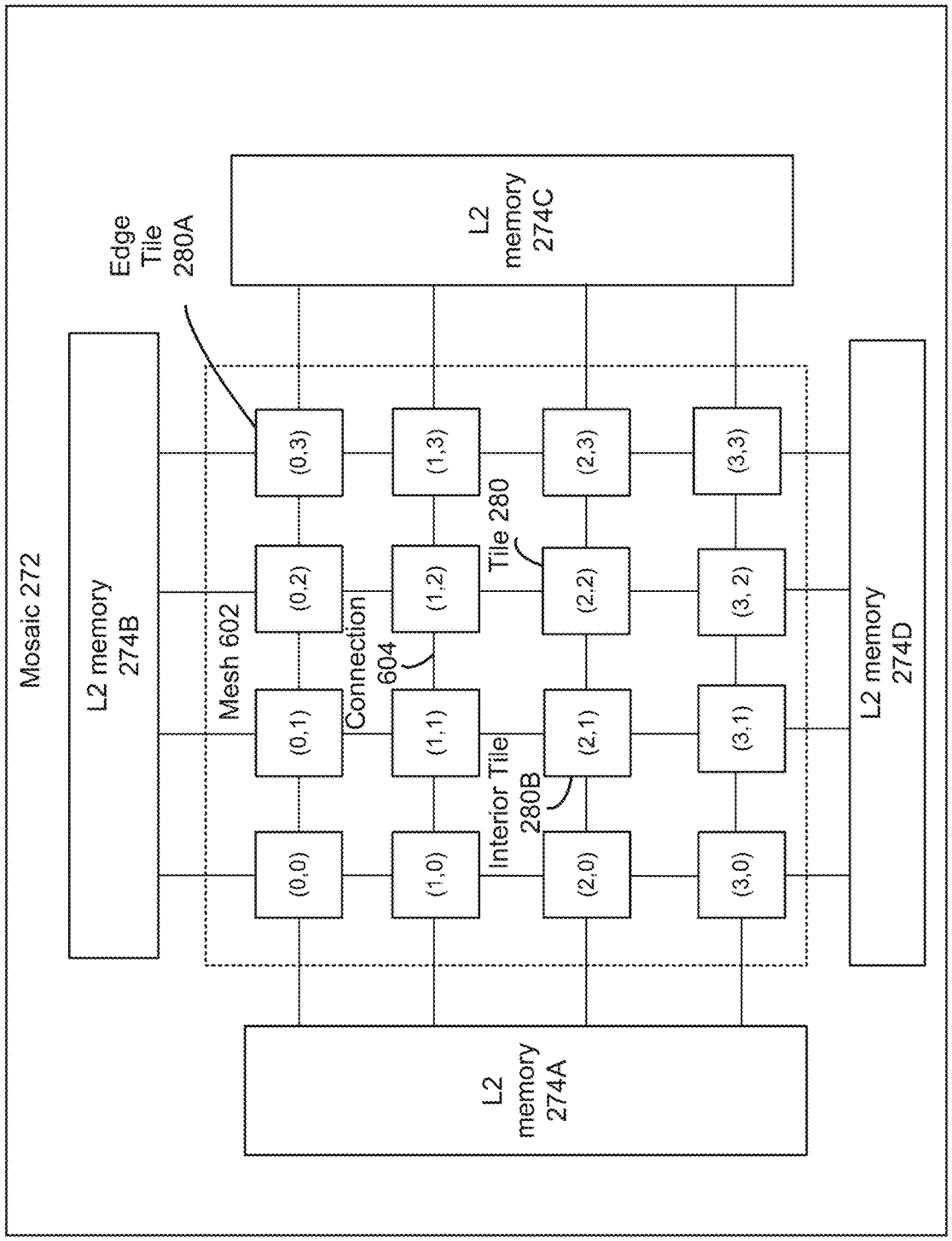
FIG. 6 is a block diagram of a mosaic within an MLA.
Figure 7:
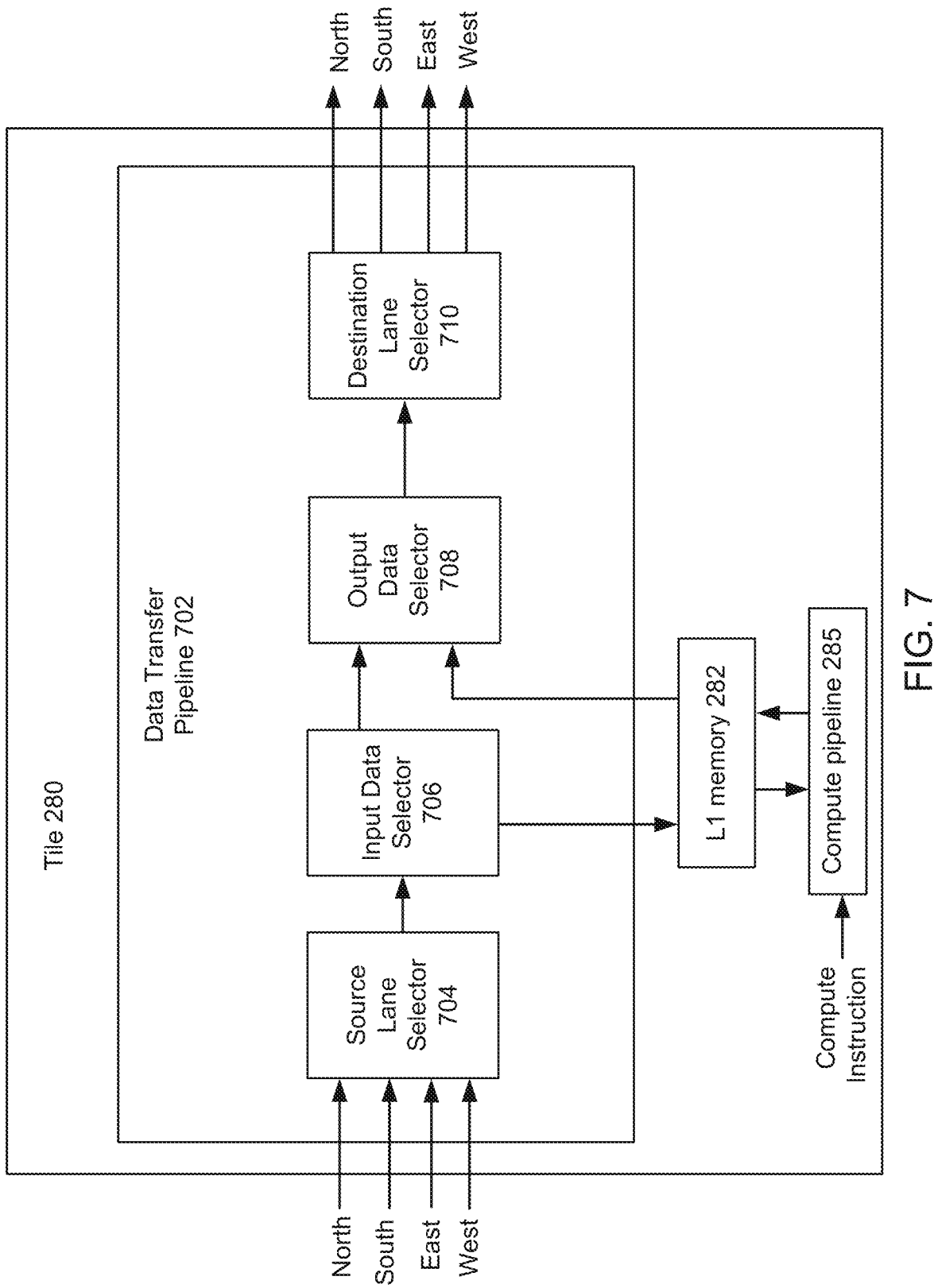
FIG. 7 is a block diagram of a data transfer pipeline of a Tile.

FIGS. 6-8 illustrate examples of generating statically scheduled data transfer instructions (steps 114-116 of FIG. 1A). FIG. 6 is a block diagram of a mosaic 272 within an MLA. The mosaic 272 includes L2 memories 274A-D and a mesh 602 of Tiles 280. The L2 memories 274 and Tiles 280 are interconnected nodes for data transfers to implement an MLN. Each Tile 280 receives Tile instructions including data transfer instructions and compute instructions for implementing the MLN. The data transfer instructions may include a move data instruction to transfer data from a Tile 280 to another Tile 280, a store data instruction to transfer data from a Tile 280 to an L2 memory 274, or a load data instruction to transfer data from an L2 memory 274 to a Tile 280. The statically scheduled data transfer instructions are generated by the compiler 120.

Each data transfer instruction defines a routing for a data transfer path from a source node to a destination node. The static schedule for the data transfer instruction identifies the time slot for execution of the data transfer. A data transfer path defined by the data transfer instruction may include one or more intermediate Tiles 280. Data transferred to a Tile 280 may be consumed by the Tile 280 according to a compute instruction. In this example, the Tile 280 is the destination node. In another example, a Tile 280 may be an intermediate Tile/node that transfers the data to another Tile 280 for consumption or to an L2 memory 274 for storage. In another example, a Tile 280 may be a source node where data originates for data transfer to another node.

The compiler 120 generates a set of data transfer instructions for the Tiles 280 that when executed at their respective start times result in no data transfer collisions. The compiler 120 knows the topology of possible data transfer paths between nodes and the data that is to be transferred to each Tile 280 for consumption. The compiler 120 uses this information to generate the data transfer instructions. The data transfer instructions are statically scheduled and define data transfer paths that are non-colliding. The compiler 120 ensures that all the paths to be used in a data transfer are free of any other data transfer once the data transfer is initiated and until the data transfer is complete. This is true for the source and destination Tiles as well as the intermediate Tiles. Similarly, accesses to the L2 memories are scheduled such that there are no conflicts in the accesses and the data paths to the L2 memories are conflict free.

The Tiles 280 are referenced using an (X,Y) coordinate system. Each Tile is connected to an adjacent node to the north, south, east, and west to allow data flow in and out of the Tile in four directions. For example, Tile(1,1) is connected to Tile(0,1) to the north, Tile(2,1) to the south, Tile(1,2) to the east, and Tile(1,0) to the west. In another example, Tile(3,0) is connected to Tile(2,0) to the north, L2 memory 274D to the south, Tile(3,1) to the east, and L2 memory 274A to the west. The arrangement of the interconnected nodes forms a topology of data transfer paths of the mosaic 272 that can be used by the compiler 120 to generate the data transfer instructions executed by the Tiles 280 to implement an MLN.

The Tiles 280 are connected with each other and to the L2 memories 274 via connections 604. The Tiles 280 include edge Tiles 280A that are each directly connected to one or more of the L2 memories 274 and interior Tiles 280B that are directly connected only to other Tiles 280. The interior Tiles 280B communicate with the L2 memories 274 via the edge Tiles 280A. The mosaic 272 may include one or more L2 memories 274. In some embodiments, one or more of the interior Tiles 280B are directly connected to an L2 memory.

Each connection 604 between nodes may include one or more data transfer lanes. Data transfer lanes provide alternative pathways for the connection 604 between two nodes. In one example, each connection 604 includes a 512-bit data bus separated into four 128-bit data transfer lanes. A data transfer path may include a particular data transfer lane. The data transfer lane to be used for a data transfer may be defined in the data transfer instruction, such as by using a 2-bit data transfer lane number. For an intermediate Tile 280 where data is passed through and not consumed, the data is sent out on the same data transfer lane that the data was received.

Each data transfer instruction includes a fully defined data transfer routing from source node to destination node. Because the compiler 120 ahead of time looks at all possible data transfers, the compiler 120 optimally schedules all the data transfers by providing the routing information in the data transfer instructions based on other data transfer instructions. In doing so, routing tables and arbitration logic in hardware can be avoided as the compiler 120 provides similar functionality while compiling the data transfer instructions. In some embodiments, as a precaution, the Tiles 280 detect collisions when data is received from nodes via a single data transfer channel in a single data transfer cycle. The Tile may generate an error signal or otherwise perform a corrective measure.

FIG. 7 is a block diagram of a data transfer pipeline 702 of a Tile 280. The data transfer pipeline 702 facilitates data transfer to and from the Tile 280 along a single data transfer lane. The Tile 280 may include multiple instances of transfer pipeline 702 to support multiple (e.g., 4) data transfer lanes. The transfer pipeline 702 is connected to the L1 memory 282 of the Tile 280, and the L1 memory 282 is connected to the compute pipeline 285. The data transfer pipeline 702 includes a source lane selector 704, an input data selector 706, an output data selector 708, and a destination lane selector 710.

The source lane selector 704 receives data from an adjacent node via a north, south, east, or west direction. The data may be in the form of a data packet including a header with data transfer instructions followed by data to be transferred (if any). The source lane selector 704 selects a data packet from the north, south, east, or west direction. The data packet is transmitted to the input data selector 706.

The input data selector 706 selectively provides the data to the L1 memory 282 for internal consumption or to the output data selector 708 for data passthrough. The input data selector 706 analyzes the header of the data packet to facilitate routing of the data of the data packet. The header of the data packet indicates the destination node, and the input data selector 706 uses the header to determine whether the Tile 280 is the destination node. If the Tile 208 is the destination node (e.g., for a move data instruction), the input data selector 706 removes the header from the data packet and provides the data of the data packet to the L1 memory 282. The L1 memory 282 stores the data and provides the data to the compute pipeline 285 for processing. If the Tile 208 is an intermediate node rather than the destination node, the input data selector 706 provides the data packet to the output data selector 708.

The header further includes the unoccupied data transfer path, which is defined by a sequence of codes. Each code of the sequence of codes defines a direction (e.g., north, south, east, or west) of data transfer between two adjacent nodes. The input data selector 706 determines the code to be used by the Tile 280 and provides the code to the destination lane selector 710. The input data selector 706 may use the first code in the sequence for routing, and then may remove the first code from the sequence.

In some embodiments, the input data selector 706 generates an updated sequence of codes by replacing the code used by the Tile 280 with a new code defining the reverse direction to the code. The code used by the Tile 280 may be removed from the sequence, and the new code may be inserted at the end of the sequence. For example, if the code used by the Tile 280 defines data transmission in the north direction, then the new code defines data transmission in the south direction. In another example, if the code defines data transmission in the east direction, then the new code defines data transmission in the west direction. The input data selector 706 replaces the sequence of codes with the updated sequence of codes in the header of the data packet. Each node along the data transfer path similarly updates a respective code in the sequence of codes. As discussed in greater detail below in connection with FIG. 8C, the original sequence of codes defines a request path from a source node to a destination node and the updated sequence of codes defines a response path from the destination node to the source node. This allows a Tile 280 to execute a load data instruction that requests data from an L2 memory 274 via the forward path and receives the data from the L2 memory 274 via the return path.

The output data selector 708 selectively provides either locally produced data received from the L1 memory 282 or passthrough data received from the input data selector 706 to the destination lane selector 710. The data from the L1 memory 282 may be an output computed by the compute pipeline 285 according to compute instructions. The data from the L1 memory 282 may also be a data packet including a header with a data transfer instruction. This data transfer instruction is an instruction being executed by the Tile 280. The output data selector 708 selects between the data from the input data selector 706 or the data from the L1 memory 282 for transmission by the Tile 280. If the Tile 280 is the source node executing a data transfer instruction, then the data from the L1 memory 282 is selected. If the Tile 280 is an intermediate node for a data transfer instruction executed by another Tile 280, then the data from the input data selector 706 is selected. The selected data output from the output data selector 708 is provided to the destination lane selector 710.

The destination lane selector 710 is connected to the output data selector 708. The destination lane selector 710 provides the data received from the output data selector 708 to an adjacent node via a north, south, east, or west direction. The destination lane selector 710 selects one of the data transfer lanes based on the code output from the input data selector 706 or the output data selector 708.

Figure 8A:
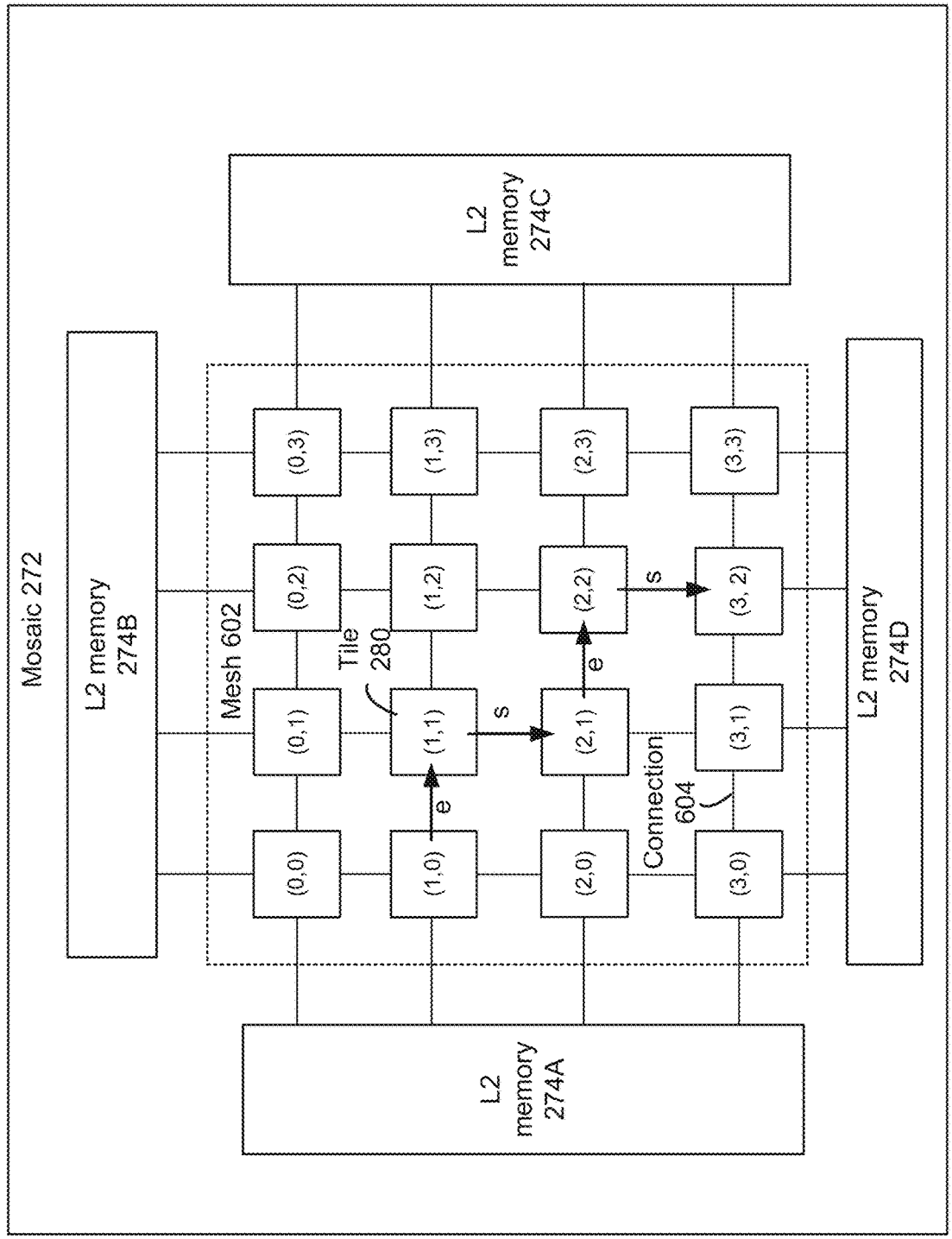
FIG. 8A illustrates an execution of a move data instruction from a source Tile to a destination Tile.

FIG. 8A illustrates an execution of a move data instruction from a source Tile(1,0) to a destination Tile(3,2). The source Tile(1,0) executes a data transfer instruction at a statically scheduled start time to move data to the destination Tile(3, 2). The data transfer instruction defines an unoccupied data transfer path using a sequence of codes defining east(e)-south(s)-east(e)-south(s). The source Tile(1,0) transfers a data packet including a header with the data transfer instruction and the data to be moved east to the intermediate Tile(1,1), the intermediate Tile(1,1) transfers the data packet south to the intermediate Tile(2,1), the intermediate Tile(2,1) transfers the data packet east to the intermediate Tile(2,2), and the intermediate Tile(2,2) transfers the data packet south to the destination Tile(3,2). If the connections 604 include multiple data transfer lanes, all the hops between adjacent nodes may use a single unoccupied data transfer lane as defined by a data transfer lane number in the header. The header further defines locations in the L1 memory 282 of the source Tile(1,0) for retrieving the data and locations in the L1 memory 282 of the destination Tile(3,2) for storing the data. The destination Tile(3,2) stores the data of the data packet in the locations in the L1 memory 282 as defined in the header.

Figure 8B:
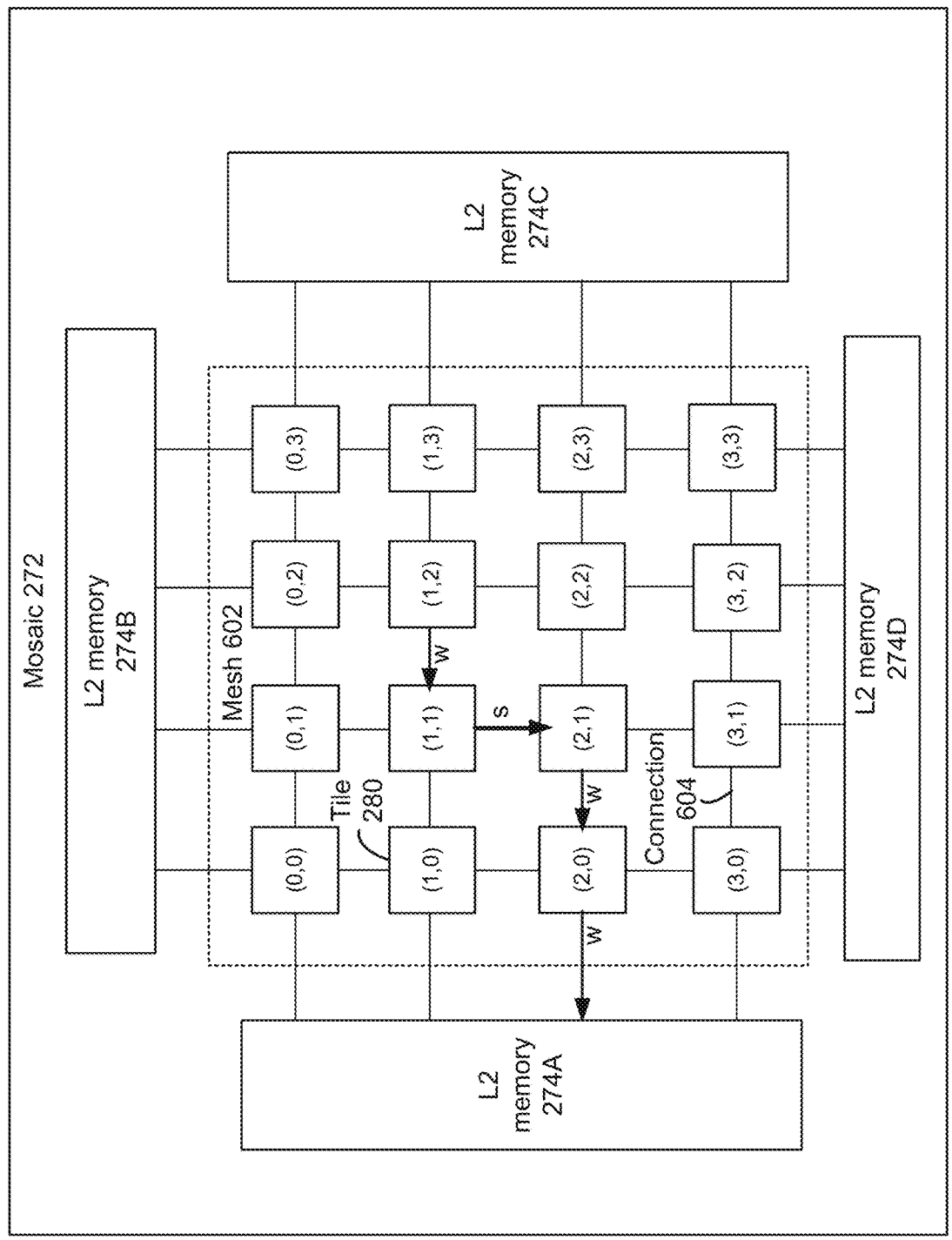
FIG. 8B illustrates an execution of a store data instruction from a Tile to an L2 memory.

FIG. 8B illustrates an execution of a store data instruction from a Tile(1,2) to an L2 memory 274A. The source Tile(1,2) executes a data transfer instruction at a statically scheduled start time to store data in the memory 274A. The data transfer instruction defines an unoccupied data transfer path using a sequence of codes defining west(w)-south(s)-west(w)-west(w). The source Tile(1,2) transfers a data packet including a header with the data transfer instruction and the data to be stored west to the intermediate Tile(1,1), the intermediate Tile(1,1) transfers the data packet south to the intermediate Tile(2,1), the intermediate Tile(2,1) transfers the data packet west to the intermediate Tile(2,0), and the intermediate Tile(2,0) transfers the data packet west to the L2 memory 274A. The header further includes a data transfer lane number defining a data transfer lane used for each of the hops between nodes. The header further defines locations in the L1 memory 282 of the source Tile(1,2) for retrieving the data and locations in the L2 memory 274A for storing the data.

Figure 8C:
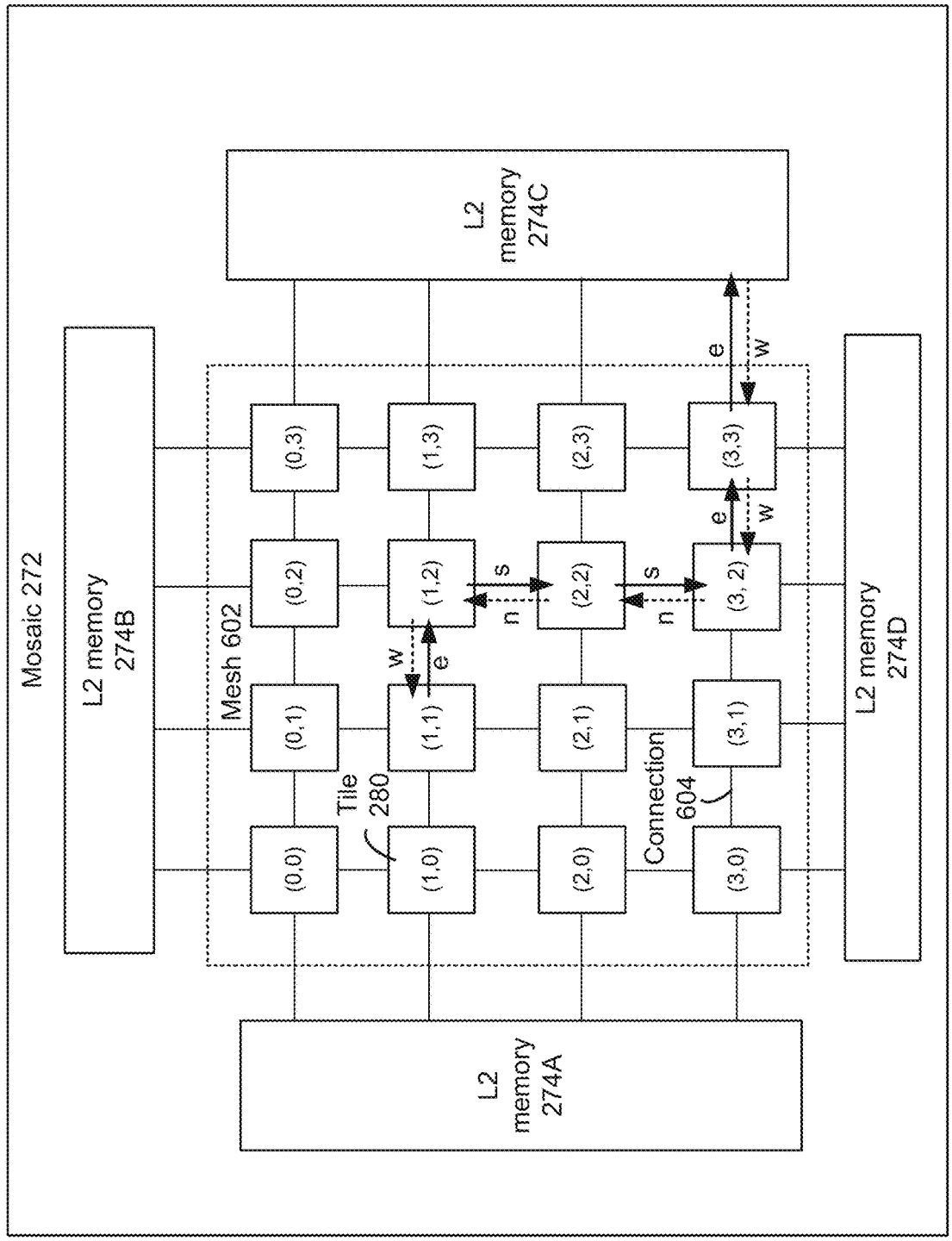
FIG. 8C illustrates an execution of a load data instruction from an L2 memory to a Tile.

FIG. 8C illustrates an execution of a load data instruction from an L2 memory 274C to a Tile(1,1). The load data instruction is a data transfer instruction that is executed by the Tile(1,1) to request data from the L2 memory 274C. The unoccupied data transfer path includes a request path from the Tile(1,1) to the L2 memory 274C and a directionally opposite response path from the L2 memory 274C to the Tile(1,1). The data packet transmitted from the source Tile(1,1) in the request includes a header and no additional data. The header defines an unoccupied data transfer path for the request using a sequence of codes defining east(e)-south(s)-south(s)-east(e)-east(e). The source Tile(1,1) transfers the data packet east to the intermediate Tile(1,2), the intermediate Tile(1,2) transfers the data packet south to the intermediate Tile(2,2), the intermediate Tile(2,2) transfers the data packet south to the intermediate Tile(3,2), the intermediate Tile(3,2) transfers the data packet east to the intermediate Tile(3,3), and the intermediate Tile(3,3) transfers the data packet east to the L2 memory 274A.

Each node along the request path replaces a code of the sequence of codes used by the node with a new code defining a reverse direction to generate an updated sequence of codes. The updated sequence of codes is subsequently used for the response path. At Tile(1,1), the header is essee. The first code in the sequence indicates that Tile(1,1) sends the data request east to Tile(1,2). Tile(1,1) updates the sequence by reversing the first code from e to w and rotating this code to the end of the sequence. Tile(1,2) receives the updated code sseew, sends the data request south to Tile(2,2) along with the updated code seewn. This repeats at each node until the data request to the L2 memory 274C contains the updated code wnnww. Reversing the order of this code yields wwnnw, which defines the return path from L2 memory 274C to Tile(1,1). The header further includes a data transfer lane number defining a data transfer lane used for each of the hops between nodes. The header further defines locations in the L2 memory 274C for retrieving the data and locations in the Tile(1,1) for storing the data. The edge Tile(3,3) requests and receives the data from the locations in the L2 memory 274C as defined in the header.

For the response path, the header information from the load data instruction executed by the Tile(1,1) with the updated sequence of codes defines a west(w)-west(w)-north(n)-north(n)-west(w) return path from the L2 memory 274C to the Tile(1,1). The Tile(3,3) transfers the data packet west to the intermediate Tile(3,2), the intermediate Tile(3,2) transfers the data packet north to the intermediate Tile(2,2), the intermediate Tile(2,2) transfers the data packet north to the intermediate Tile(1,2), and the intermediate Tile(1,2) transfers the data packet west to the Tile(1,1). The Tile(1,1) stores the data of the data packet in the locations in the L1 memory 282 as defined in the header.

FIGS. 6-8 show some examples. Other variations will be apparent. The routing path may include wait cycles. "eene" defines a routing of east-east-north-east, whereas "eexxne" defines a routing of east-east-wait-wait-north-east. For example, Tiles may be connected by variable-width lanes, with the data transfer instructions specifying the widths of the lanes to use for the data transfers. As another example, the lanes may be virtualized, so that the data transfer instructions specify virtual data transfer paths for the data transfers. As a final example, the Tiles may have multiple i/o ports, with the data transfer instructions specifying which i/o ports to use for the data transfers.

Figure 9:
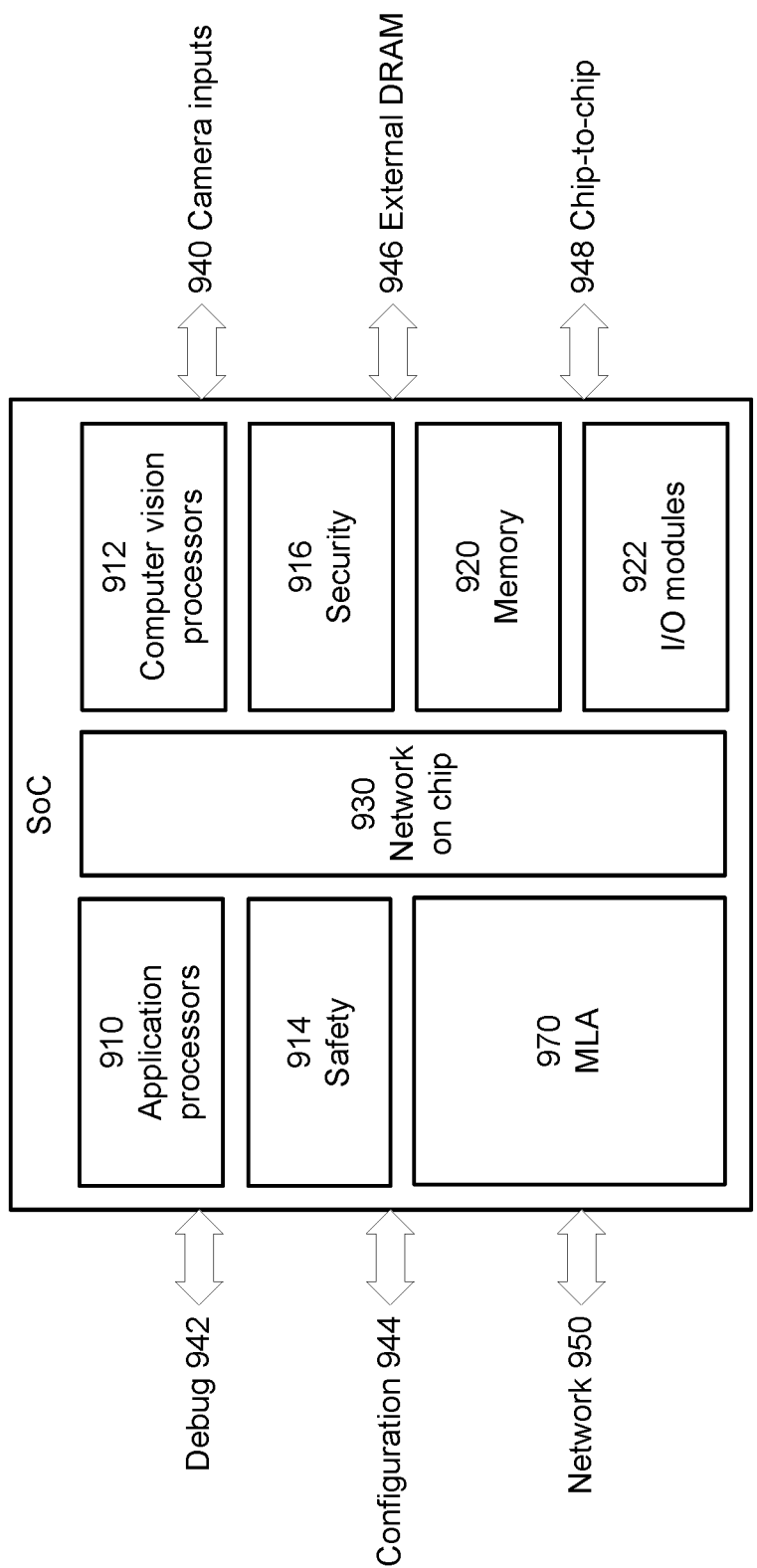
FIG. 9 is a block diagram of an integrated circuit product that includes an MLA.

FIG. 9 is a block diagram of an integrated circuit that includes an MLA 970. In other words, other components may be included on the same die as the MLA. This example includes the following additional blocks: application processor 910 (e.g., general purpose CPU running applications), computer vision processor 912 (or other types of application-specific processors), safety 914, security 916, additional SRAM (memory) 920 and input/output circuitry 922. It also includes a network 930 for communication between the different components. This type of semiconductor chip may be referred to as a system-on-chip (SoC).

The connections to the external world include camera inputs 940 for the computer vision processors, ports for debug 942 and configuration 944, a connection 946 to external memory (e.g., DRAM), chip-to-chip connections 948, and network connections 950 (e.g., Ethernet and PCIe).

The SoC of FIG. 9 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 912, which perform initial operations such as edge detection and enhancement, contrast enhancement, motion detection, and optical flow. Raw and/or processed images may be then input to the MLA 970 for analysis by the machine learning network. The MLA may also receive other inputs, such as metadata from other sources and data from other sensors. The application processors 910 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a performance of at least 50 TOPs (50 trillion operations per second) at a power consumption of not more than 5 watts. The performance may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. For example, scheduling of the loading of L2 memories from external memory and accesses from Tiles may also be ensured to be free of conflicts. In another example, (e.g., L2) memories execute data transfer instructions as discussed herein for Tiles, such as to send data to a Tile instead of the Tile executing a load data instruction. In another example, the static scheduling of data transfer paths by the compiler discussed herein may be used with other topologies for connected Tile and memory nodes. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method implemented on a computer system for generating a computer program containing instructions, the instructions implementing a machine learning network on a machine learning accelerator (MLA), the MLA comprising a plurality of interconnected processing elements implemented on a semiconductor die, the processing elements executing the instructions stored in memory on the MLA, the method performed by a software compiler and comprising:

receiving a description of the machine learning network;
   accessing a description of a topology of interconnections between processing elements;
   allocating computations that implement the machine learning network to processing elements for execution;
   determining data transfers for transfer of data to or from processing elements in order to execute the computations, the data transfers determined based on the topology of the interconnections between the processing elements;
   generating a computer program comprising compute instructions that implement the computations and data transfer instructions that implement the data transfers, the compute instructions and the data transfer instructions executed by the processing elements from the memory on the MLA, wherein generating the computer program comprises:
      determining non-conflicting data transfer paths for the data transfers based on the topology of the interconnections between processing elements, on dependencies of the instructions and on a duration for execution of the instructions; wherein each data transfer path specifies a routing and a time slot for the data transfer;
      generating data transfer instructions that specify routing of the data transfers; and
      generating a static schedule that schedules execution of the data transfer instructions during the time slots for the data transfers, the static schedule also scheduling execution of the compute instructions, wherein an execution order of the statically scheduled data transfer instructions and compute instructions by the processing elements does not depend on run-time conditions, branching or values of inputs to the instructions; and
   outputting the computer program.

2. The computer-implemented method of claim 1, wherein determining non-conflicting data transfer paths comprises:
   determining candidate data transfer paths for the data transfers;
   determining which of the candidate data transfer paths are available; and
   selecting from among the available candidate data transfer paths.

3. The computer-implemented method of claim 1, wherein determining non-conflicting data transfer paths comprises:
   generating default data transfer paths for the data transfers;
   determining conflicts among the default data transfer paths; and
   modifying the data transfer paths to resolve the conflicts.

4. The computer-implemented method of claim 1, wherein:
   in the topology of the interconnections between the processing elements: adjacent processing elements are connected by multiple data transfer lanes; and
   the data transfer instructions also specify which data transfer lanes to use for the data transfers.

5. The computer-implemented method of claim 1, wherein:
   in the topology of the interconnections between the processing elements: adjacent processing elements are connected by variable-width lanes; and
   the data transfer instructions also specify widths of the lanes to use for the data transfers.

6. The computer-implemented method of claim 1, wherein:
   data transfer paths are virtualized; and
   the data transfer instructions specify virtual data transfer paths for the data transfers.

7. The computer-implemented method of claim 1, wherein:
   in the topology of the interconnections between the processing elements: processing elements have multiple i/o ports; and
   the data transfer instructions also specify which i/o ports to use for the data transfers.

8. The computer-implemented method of claim 1, wherein the data transfer instructions include a store data instruction to transfer data from one of the processing elements to a memory also on the semiconductor die but outside the interconnected processing elements.

9. The computer-implemented method of claim 1, wherein:
   the data transfer instructions include a load data instruction to transfer data from a memory also on the semiconductor die but outside the interconnected processing elements to one of the processing elements; and
   the data transfer path for the load data instruction includes a request path from the processing element to the memory to provide a request for the data to the memory, and a response path from the memory to the processing element to provide the data to the processing element responsive to the request.

10. The computer-implemented method of claim 1, wherein the data transfer instructions include a move data instruction to transfer data from one of the processing elements to another one of the processing elements, and the data transfer instruction includes a sequence of codes defining the routing of the data transfer path, each code defining a direction of data transfer between two adjacent processing elements.

11. The computer-implemented method of claim 10, wherein the processing elements along the data transfer path:
   determine a next processing element along the data transfer path using a first code of the sequence of codes;
   generate an updated sequence of codes by replacing the first code with a second code, the second code defining a direction of data transfer opposite to the direction defined by the first code; and
   provide the updated sequence of codes to the next processing element.

12. The computer-implemented method of claim 10, wherein the processing elements along the data transfer path:

use the sequence of codes to route first data along the data transfer path;

generate an updated sequence of codes that specify a reverse of the data transfer path; and use the updated sequence of codes to route second data along the reverse of the data transfer path.

13. The computer-implemented method of claim 1, wherein, in the topology of the interconnections between the processing elements: the processing elements include interior processing elements that are directly connected to other processing elements and edge processing elements that are also directly connected to a memory also on the semiconductor die but outside the interconnected processing elements.

14. The computer-implemented method of claim 13, wherein, in the topology of the interconnections between the processing elements: at least one interior processing element is directly connected to the memory.

15. The computer-implemented method of claim 13, wherein the data transfer instructions include a load data instruction to transfer data from the memory to an interior processing element via one of the edge processing elements.

16. The computer-implemented method of claim 1, wherein the machine learning network comprises a plurality of layers and allocating computations to processing elements comprises:

determining, for each layer, a partial computation metric based on the computations performed to implement that layer; and allocating the processing elements to layers based on the partial computation metric.

17. The computer-implemented method of claim 1, wherein the processing elements execute the data transfer instructions without using a hardware routing table.

18. The computer-implemented method of claim 1, wherein the processing elements execute the data transfer instructions without performing congestion or collision arbitration in hardware.

19. A non-transitory computer readable storage medium storing instructions for generating a computer program containing instructions, the instructions implementing a machine learning network on a machine learning accelerator (MLA), the MLA comprising a plurality of interconnected processing elements implemented on a semiconductor die, the processing elements executing the instructions stored in memory on the MLA, the instructions when executed by one or more processors causing the one or more processors to perform steps including:

receiving a description of the machine learning network;

accessing a description of a topology of interconnections between processing elements;

allocating computations that implement the machine learning network to processing elements for execution;

determining data transfers for transfer of data to or from processing elements in order to execute the computations, the data transfers determined based on the topology of the interconnections between the processing elements;

generating a computer program comprising compute instructions that implement the computations and data transfer instructions that implement the data transfers, the compute instructions and the data transfer instructions executed by the processing elements from the memory on the MLA, wherein generating the computer program comprises:

determining non-conflicting data transfer paths for the data transfers based on the topology of the interconnections between processing elements, on dependencies of the instructions and on a duration for execution of the instructions; wherein each data transfer path specifies a routing and a time slot for the data transfer;

generating data transfer instructions that specify routing of the data transfers; and generating a static schedule that schedules execution of the data transfer instructions during the time slots for the data transfers, the static schedule also scheduling execution of the compute instructions, wherein an execution order of the statically scheduled data transfer instructions and compute instructions by the processing elements does not depend on run-time conditions, branching or values of inputs to the instructions; and outputting the computer program.

20. The computer readable storage medium of claim 19, wherein determining non-conflicting data transfer paths comprises:

determining candidate data transfer paths for the data transfers;

determining which of the candidate data transfer paths are available; and selecting from among the available candidate data transfer paths.

* * * * *